United States Patent [19]

Nanri et al.

[11] Patent Number: 4,537,822

[45] Date of Patent: Aug. 27, 1985

[54] THREE-LAYERED FABRIC MATERIAL

[75] Inventors: Shosuke Nanri; Kazuyoshi Tsuchida, both of Otsu, Japan

[73] Assignee: Toyo Boseki Kabushiki Kaisha, Osaka, Japan

[21] Appl. No.: 577,282

[22] Filed: Feb. 6, 1984

[30] Foreign Application Priority Data

Feb. 8, 1983 [JP]  Japan .................................. 58-19508

[51] Int. Cl.³ .............................................. B32B 7/02
[52] U.S. Cl. ..................................... 428/212; 428/246; 428/248; 428/284; 428/286; 428/297; 428/298; 428/300; 428/920
[58] Field of Search ................ 428/219, 246, 248, 284, 428/287, 297, 298, 300, 920, 286, 212

[56] References Cited

U.S. PATENT DOCUMENTS

| | | | |
|---|---|---|---|
| 3,545,442 | 12/1970 | Wicker et al. | 428/300 |
| 3,916,447 | 11/1975 | Thompson | 418/284 |
| 4,128,686 | 12/1978 | Hyle et al. | 428/300 |
| 4,196,245 | 4/1980 | Hitson et al. | 428/297 |
| 4,211,227 | 7/1980 | Anderson et al. | 428/198 |
| 4,355,066 | 10/1982 | Newman | 428/286 |
| 4,377,615 | 3/1983 | Suzuki et al. | 428/286 |
| 4,416,936 | 11/1983 | Frickson et al. | 428/298 |

Primary Examiner—James J. Bell
Attorney, Agent, or Firm—Wenderoth, Lind & Ponack

[57] ABSTRACT

The present invention relates to a three-layered fabric material composed of a non-woven fabric of hydrophobic fibers not more than 1 denier in single-filament denier as the inner layer, a fabric of hydrophilic fibers as the intermediate layer and a fabric of hydrophobic fibers larger in denier than the fibers of the intermediate layer as the outer layer. Clothing made of said three-layered fabric material provides excellent heat retentivity and especially, excellent comfortableness when it is in wear.

10 Claims, 2 Drawing Figures

THREE-LAYERED FABRIC MATERIAL

The present invention relates to a three-layered fabric material which provides excellent heat retentivity and especially, excellent comfortableness when used as clothing which requires heat retentivity.

Up to the present, natural feather is known as an excellent heat retaining material, but it is limited in use because it is expensive, bulky and liable to come out of clothing. In place of such material, thermal insulating textile materials made of synthetic fibers are being developed in recent years. The development of thermal insulation material up to this time has relied on how to utilize air, which is thermally non-conductive, to its maximum effect. That is to say, the formation of a three-dimensional structure of entangled fine fibers, and the utilization of a great quantity of air held in the space of the three-dimensional network structure. Such air, contained in the network fiber structure and having little fluidity, has a heat-non-conducting and heat-insulating function, and acts as "dead air." Therefore, the points of research have been how to obtain such fine fibers and how to form the fine fibers into a three-dimensional sheet, namely methods of fabric- or web-formation. Also, to prevent the radiation of heat, methods have been studied wherein metals are vapor-deposited on the surface of the sheet. However, although these thermal insulation materials have excellent heat retentivity, no sufficient consideration has been paid on the thermo-physiology of human body, and thus they are not comfortable when used as clothing. That is to say, these thermal insulation materials have a sufficient heat insulating effect, but no sufficient consideration has been paid on the disposal of the sweat (insensible perspiration and sweating) secreted from human body, especially the sweat secreted during the time of sports, and the thermal insulation materials have not been able to discharge the sweat to the environment, with the sweat condensing within clothing or between the skin and clothes. This has resulted in extreme uncomfortableness when in wear, giving a sultry feel, sticky feel and even a chilly feel, and thus they have been unsuited as thermal insulation material for clothing use.

To eliminate the above-mentioned defects, we conducted intensive research, and as a result we have succeeded in obtaining a three-layered fabric material which is excellent in heat retentivity and comfortableness.

An object of the present invention is to obtain a three-layered fabric material having excellent heat retentivity and especially having excellent comfortableness when used as clothing. More particularly, the object is to obtain a three-layered fabric material, of which the time required for reaching a comfortable temperature within clothing (temperature between the skin and clothes) is short and yet the time maintained at this temperature is long, and moreover the residual moisture is little. Other object of the invention will become apparent from the following description and drawings.

The present invention is a three-layered fabric material composed of a non-woven fabric of hydrophobic fibers not more than 1 denier in single-filament denier as the inner layer, a fabric of hydrophilic fibers as the intermediate layer and a fabric of hydrophobic fibers larger in denier than the fibers of the intermediate layer as the outer layer. The inner layer of the three-layered fabric material is placed at the human body side and the outer layer at the outer atmospheric side. On the inner and outer layer sides, suitable fabrics are put to form clothes.

Figure 1:
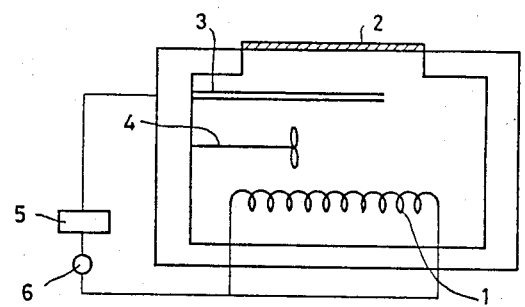
FIG. 1 is a diagrammatic view of a heat retentivity measuring apparatus of the present invention.
Figure 2:
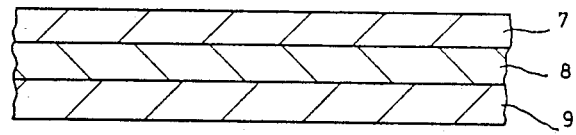
FIG. 2 is a sectional view of the three-layered fabric material of the present invention.

In the present invention, the term "hydrophobic fibers" means fibers, of which the official moisture regain defined in JIS L-1070 Standard is less than 2%, and which have a difference from hydrophilic fibers in the moisture regain of more than 1%. Such fibers include, for example, polypropylene fibers, polyester fibers, etc. The term "hydrophilic fibers" means fibers having an official moisture regain of more than 2%, preferably more than 4%. Such fibers include cotton, rayon, Promix (protein-polyvinyl compound grafted copolymer) fibers, modified polyester fibers improved to have hydrophilicity, etc.

In the present invention, the inner layer 7 of the three-layered fabric material means the layer facing to the human body side when the material is in wear as clothing, and the intermediate layer 8 is the layer interposed between the inner layer and the outer layer. The outer layer 9 means the layer facing to the atmospheric side. The fabric means a knit, woven or non-woven fabric.

The fibers forming the inner layer 7 are hydrophobic fibers, and the smaller the single-filament denier of the composing fibers, the better is the heat retentivity. It is preferred that the denier should be not more than 1 denier, preferably from 0.01 to 1.0 denier. For sufficient heat insulation and moisture permeation, the fabric structure is preferably a non-woven structure rather than a knit or woven structure.

The fibers forming the intermediate layer 8 are hydrophilic fibers, and it is necessary that the fibers have good heat retentivity and can absorb sweat. By being laminated with the hydrophobic fibers of the inner layer, the hydrophilic fibers of the intermediate layer absorb sweat actively without retaining sweat in the hydrophobic fiber layer. The smaller the denier of the fibers composing the intermediate layer, the better is the heat retentivity, and 0.01–1 denier fibers are preferred. The fabric structure is preferably a non-woven structure but knit or woven fabrics may be used.

The fibers forming the outer layer 9 are hydrophobic fibers and act as fins for discharging the moisture of the intermediate layer into the environment. The single-filament denier of the fibers composing the outer layer is larger than that of the intermediate layer and the inner layer, and is from 3 to 30 deniers, preferably from 4 to 10 deniers. The fabric structure is preferably a non-woven structure but knit or woven fabrics may be used.

The weight per area of the three-layered fabric material of the present invention composed of the inner, intermediate and outer layers is preferably from 60 g/m$^2$ to 300 g/m$^2$, and especially preferred is from 75 g/m$^2$ to 250 g/m$^2$. The ratio of the weight per area of the inner layer to that of the intermediate layer is preferably from 2:1 to 1:2, and the ratio of that of the inner layer to that of the outer layer is preferably from 5:1 to 1:1.

The method of forming the three-layered fabric material by putting the inner layer, intermediate layer and outer layer one over another may be a bonding method using no adhesive like the needle punching method, or may be coarse sewing by a sewing machine like Arachne method. Bonding with an adhesive may also be used, but in this case it is not preferable to fill the spaces between the fibers completely with the adhesive, and dot bonding is preferred. The heat-activated type adhesives used for dot bonding include ethylene-vinyl acetate copolymers, polyamides, polyesters, etc. It is not necessary that each of the inner layer, intermediate layer and outer layer should be a single layer and may be composed of a plurality of layers.

The modified polyester fibers improved to have hydrophilicity to be used for the intermediate layer can be obtained, for example, according to the method described in Japanese Patent Publication No. 8590/78 or Japanese Patent Kokai No. 25894/77 wherein polyester fibers are graft-polymerized with acrylic acid to give hydrophilic characteristics to the polyester fibers.

By attaching a suitable knit or woven fabric to the inner layer side and outer layer side of the three-layered fabric material of the present invention, it is possible to produce ski-wear, jackets, mountain-climber's shirts, golf wear, coats, trousers, cold-protection wear, fishing wear, baseball uniform, etc. When the body is kept quiet and does not sweat, the above-mentioned clothes provide good heat retentivity, and even when the body sweats as a result of physical exercise, the clothes absorb more sweat and discharch it more rapidly into the environment, so that less sweat remains within the clothes, with no decrease in heat retentivity.

In the following, the invention will be explained by way of Examples, in which the heat retentivity in dry heat conditions, heat retentivity in sweating conditions, residual moisture and temperature within clothing are measured as follows:

(1) Heat retentivity in dry heat conditions

This heat retentivity is expressed by CLO value. One CLO means such a heat insulating property of a garment that a man, clothed in said garment and sitting quietly under the conditions of an environmental temperature of 21° C., a relative humidity of 50% and an air flow speed of 10 cm/sec, feels comfortable. The metabolic energy at this state is 50 Kcal/m$^2$. hr and the skin temperature is 33° C. In actual practice, the consumed amount of electricity necessary for maintaining a heat source plate at the temperature of 36° C. is measured, using for example a test apparatus of ASTM D-1518-77 for thermal transmittance, and the measured value is converted into a CLO value. In the present invention, the consumed amount of electricity was measured by the heat retentivity measuring apparatus shown in FIG. 1. In the drawing, numeral 1 is an electric heater for adjusting the air temperature to 36° C., 2 is a test specimen, 3 is a thermostat, 4 is a fan, 5 is a temperature regulator and 6 is a digital timer. Also, the environmental temperature is regulated to 20° C., the relative humidity to 65% RH and the air flow speed to 0.1 m/sec. After the temperature in the box has become constant at 36° C., a test specimen, 2, 10×10 cm in size, is placed, and the amount of electricity cosumed in one hour for maintaining the temperature at 36° C. is measured.

The CLO value is obtained by the following formula:

$$CLO \text{ value} = \frac{T_1 - T_o}{Q} \times \frac{1}{0.18}$$

wherein
$Q = 0.86 \times W \times (t/3600) \times (1/S)$ $T_1$ is the environmental temperature (20° C.)
$T_o$ is the temperature within the heater box (36° C.)
$Q$ is calories added (in Kcal/m$^2$.hr)
$W$ is electric power (heater capacity) 1 W=0.86 Kcal Joule's heat
$t$ is heating time (in seconds)
$S$ is the surface area of the test specimen (2) Heat retentivity in sweating conditions and residual moisture The heat retentivity in sweating conditions was measured by using a simulator of the microclimate within clothing which simulates the temperature and humidity conditions within the clothing of a man sweating in an environmental condition of the severe cold of −5° C. (Japanese Patent Kokai No. 21164/83). Also, the residual moisture after the measurement of the heat retentivity was calculated by the following formula:

Residual moisture =
(Weight of the test specimen after 60 min.) −
(Weight of the test specimen before measurement)

The test speciment used was conditioned for one day in an atmosphere maintained at 20° C. and 65% RH. The surface area of the specimen was 70 cm$^2$ and therefore the residual moisture is given in the value of mg/70 cm$^2$. The thickness of the three-layered fabric material was measured under a load of 0.2 g/cm$^2$ and was given in mm.

(3) Temperature within clothing

The temperature within clothing means the temperature between the skin and clothing, and when temperature within clothing is 32±1° C., the temperature is called comfortable temperature within clothing. The time (minutes) required for reaching the above-mentioned comfortable temperature within clothing and the time (minutes) maintained at this temperature were measured by using a simulator of the microclimate within clothing (Japanese Patent Kokai No. 21164/83) which simulates the temperature and humidity conditions within the clothing of a man, in an environmental condition of the severe cold of −5° C., who is clothed in an undershirt, an intermediate garment and a garment made of the heat retaining material of the present invention with the latter outermost, and who is sweating an amount of sweat which would be secreted at the time of an exercise like running (an amount of moisture of 190 g/1.6 m$^2$.hr).

EXAMPLE 1

Polyester staple fibers (A) having a single-filament denier of 0.7 and cut lengths of 35 mm, polynosic staple fibers (B) (equilibrium moisture regain: 11.5%) of a single-filament denier of 1.0 and cut lengths of 38 mm, and polyester staple fibers (C) of a single-filament denier of 4.5 and cut lengths of 65 mm were separately carded and formed into a carded web. After these webs were combined and laminated, the laminated web was subjected to needle-punching treatment and then regulated for its thickness by means of an embossing calender to obtain the fabric materials shown in Experiment No. 1 to No. 7 of Table 1.

Experiment No. 1 was conducted for a single-layer material of the polyester staple fibers (A). Experiment No. 2 to No. 4 were conducted for a three-layered material composed of the polyester staple fibers (A) as the inner layer, the polynosic staple fibers (B) as the intermediate layer and the polyester staple fibers (C) as the outer layer. Experiment No. 5 was conducted for a two-layered material composed of the polyester staple fibers (A) as the inner layer and the polynosic staple fibers (B) as the outer layer. Experiment No. 6 was conducted for a three-layered material composed of the polynosic staple fibers (B) as the inner layer, the polyester staple fibers (A) as the intermediate layer and the polyester staple fibers (C) as the outer layer. And Experiment No. 7 was conducted for a single-layer material of the polynosic staple fibers (B).

was a little larger than that of the material in Experiment No. 1, the heat retentivity in dry heat conditions was low. The residual moisture was large and although water drops as seen in the single layer material composed only of hydrophobic fibers were not observed, the material was in a wet state as a whole.

EXAMPLE 2

A web of polyester long filaments was produced according to the spunbonding system. The denier of the

TABLE 1

| | Composition of the laminates and evaluation of their heat retentivity | | | | | | | |
|---|---|---|---|---|---|---|---|---|
| | Web composition (g/m$^2$) | | | Laminate | | Heat retentivity in dry heat conditions (CLO value) | Heat retentivity in wet heat conditions | | |
| | | | | | | | Comfortable temperature within clothing (32 ± 1° C.) | | |
| Experiment No. | Inner layer | Intermediate layer | Outer layer | Weight per area (g/m$^2$) | Thickness (mm) | | Time required for reaching this temp. (min) | Time maintained at this temperature (min) | Residual moisture (mg/70 cm$^2$) |
| 1 | 210 | — | — | 210 | 4.0 | 0.67 | 13 | 30 | 265 |
| 2 | 90 | 90 | 30 | 210 | 3.5 | 0.63 | 15 | >45 | 65 |
| 3 | 90 | 90 | 45 | 225 | 4.0 | 0.63 | 15 | >45 | 65 |
| 4 | 120 | 45 | 45 | 210 | 3.7 | 0.65 | 16 | >44 | 63 |
| 5 | 110 | — | 110 | 220 | 4.0 | 0.65 | 15 | 40 | 165 |
| 6 | 90 | 90 | 45 | 225 | 4.0 | 0.62 | 30 | 20 | 280 |
| 7 | 210 | — | — | 210 | 4.2 | 0.60 | 32 | 25 | 310 |

As seen from Table 1, the material used in each of Experiment No. 2 to No. 4 was a three-layered fabric material of the present invention composed of hydrophobic fibers as the inner layer, hydrophilic fibers as the intermediate layer and hydrophobic fibers larger in denier than the fibers of the hydrophilic fibers of the intermediate layer as the outer layer. In these materials the comfortable temperature within clothing (32±1° C.) was reached rapidly, the time maintained at this temperature was long, and the residual moisture was little, showing that the heat retentivity in sweating conditions was excellent. The material used in Experiment No. 6 was a three-layered fabric material in which hydrophilic fibers were arranged as the inner layer and hydrophobic fibers as the intermediate layer and the outer layer. In this experiment, the times required for reaching the comfortable temperature within clothing was very long. After reaching this temperature, the temperature within clothing dropped again and the time maintained at this temperature was short. Also, the residual moisture was large and water drops were observed on the hydrophobic fibers of the intermediate layer, showing that the heat retentivity in sweating conditions was low.

The material used in Experiment No. 5 was a two-layered material composed of a hydrophobic fiber layer and a hydrophilic fiber layer. This material was low in heat retentivity in wet heat conditions and was insufficient as a heat retaining material.

The material used in Experiment No. 1 was a single layer material composed only of hydrophobic fibers. Since the denier of the fibers composing the material was 0.7 denier, the material had good heat retentivity in dry heat conditions. It reached the comfortable temperature within clothing rapidly, but the time maintained at this temperature was short. The residual moisture was large and water drops were observed in the material. Therefore this material was not good enough as a thermal insulation material.

The material used in Experiment No. 7 was a single layer material composed of hydrophilic fibers only. Since the denier of the fibers composing the material filaments composing web was 0.2 denier. The web weight was 85 g/m$^2$. This web was subjected to the following hydrophilizing treatment, wherein parts are by weight.

To an emulsion system composed of one part of benzoyl peroxide, 8 parts of monochlorobenzene, 2 parts of NOIGEN ET-160 (a nonionic surface-active agent produced by Daiichi Kogyo Seiyaku, K.K.), a prescribed amount of sodium carbonate, and 1000 parts of water, 8 parts of mixed monomers of acrylic acid and methacrylic acid in the ratio of 2:3 was added to prepare a graft-polymerization bath. In this bath, 20 parts of the web of the polyester long filaments was immersed, and graft-polymerized the polyester long filaments was immersed, and graft-polymerized at 100° C. for one hour under a nitrogen gas atmosphere. Then, an alkali-treatment solution composed of 2 parts of soda ash, 0.3 part of tripolyphosphoric acid, 18 parts of NOIGEN HC, and 1000 parts of water was prepared. In this solution, 20 parts of the graft-polymerized web of the polyester long filaments was immersed and treated at 80° C. for 20 minutes. After water-washing and drying, a hydrophilic web of the polyester long filaments was obtained. The denier of the filaments of this hydrophlic web was 0.22 denier, the web weight was 95 g/m$^2$, and the equilibrium mositure regain was 13.5%.

A laminated fabric material was produced by laminating the non-treated polyester web as the inner layer, the hydrophilic polyester web as the intermediate layer, and a card web (weight 40 g/m$^2$) of polyester staple fibers (4.5 d, 65 mm) as the outer layer. The laminated material was subjected to needle-punching treatment, and then regulated for its thickness by an embossing calender. In this way a three-layered fabric material was obtained The weight of this material was 223 g/m$^2$ and the thickness was 2.7 mm under a load of 0.2 g/cm$^2$.

The heat retentivity of this three-layered fabric material was evaluated. The result was that the heat retentivity in dry heat conditions was 0.69 CLO, the time required for reaching the comfortable temperature within clothing was 13 minutes, the time maintained at this temperature was more than 47 minutes, and the residual moisture was 70 mg/70 cm$^2$, with no water observed in the material. Thus, the three-layered fabric material was rated excellent in heat retentivity.

EXAMPLE 3

A web of polyester long filaments was produced according to the spunbonding system. The web was subjected to hydrophilizing treatment, following Example 2. Three-layered fabric materials were produced by laminating a non-treated polyester web as the inner layer, the above-mentioned hydrophilic polyester web as the intermediate layer and a non-treated polyester web as the outer layer. In producing these fabric materials, various single-filament deniers were used, as shown in the web composition of Table 2. The results of the evaluation of the heat retentivity of these fabric materials are shown in Table 2.

TABLE 2

| | Web composition | | | | | | Laminate | | Heat retentivity in dry heat conditions (CLO) | Heat retentivity in wet heat conditions | | |
|---|---|---|---|---|---|---|---|---|---|---|---|---|
| | Single-filament denier | | | Weight (g/m$^2$) | | | | | | Comfortable temperature within clothing (32 ± 1° C.) | | |
| Experiment No. | Inner layer | Intermediate layer | Outer layer | Inner layer | Intermediate layer | Outer layer | Weight | Thickness | | Time required for reaching this temp. (min) | Time maintained at this temp. (min) | Residual moisture (mg/70 cm$^2$) |
| 8 | 0.1 | 0.12 | 1.5 | 82 | 90 | 40 | 210 | 3.6 | 0.67 | 13 | >47 | 62 |
| 9 | 0.1 | 0.12 | 0.1 | 82 | 90 | 42 | 210 | 3.5 | 0.68 | 13 | 30 | 212 |
| 10 | 0.7 | 0.12 | 1.5 | 82 | 90 | 45 | 213 | 3.8 | 0.66 | 15 | >45 | 63 |
| 11 | 0.7 | 0.7 | 1.5 | 85 | 92 | 45 | 220 | 3.9 | 0.66 | 15 | >45 | 65 |
| 12 | 1.5 | 1.5 | 1.5 | 85 | 92 | 45 | 220 | 3.9 | 0.60 | >60 | — | 230 |
| 13 | 1.5 | 1.5 | 2.5 | 85 | 92 | 45 | 220 | 4.0 | 0.58 | >60 | — | 150 |

As seen in Table 2, each material used in Experimental No. 8, No. 10 and No. 11 was a three-layered fabric material of the present invention. Since hydrophobic fibers less than 1.0 denier were used for the inner layer, and the hydrophobic fibers composing the outer layer were larger in denier than the fibers composing the intermediate layer, it is seen that the comfortable temperature within clothing was reached rapidly, the time maintained at this temperature was long, the residual moisture was little, and the heat retentivity was excellent even in sweating conditions. Although in Experiment No. 9 the single-filament denier of the hydrophobic fibers in the inner layer was less than 1 denier, since the denier of the fibers composing the outer layer was smaller than the denier of the fibers composing the intermediate layer, the time maintained at the comfortable temperature within clothing was short, and the residual moisture was large. Thus, the fabric material of Experiment No. 9 was not suitable as a heat retaining material.

In Experiment No. 12 and No. 13, since the denier of the hydrophobic fibers composing the inner layer was larger than 1 denier, the heat retentivity in dry heat conditions was low and the comfortable temperature within clothing (32±1° C.) could not be reached, so that the materials of Experiment No. 12 and No. 13 were not suitable as a heat retaining material.

EXAMPLE 4

In the fabric material of this Example, the web of polyester long filaments shown in Example 2 was used as the inner layer, and as the intermediate layer was used a knitted fabric, 90 g/m$^2$ in weight, woven with a spun yarn of no. 30 count made from Egyptian cotton (equilibrium moisture regain: 8.0%) of 1.9 deniers. For the outer layer was used a card web (weight: 40 g/m$^2$) of polyester fibers having a single-filament denier of 4.5 and cut lengths of 65 mm. These layers were laminated, and the laminate was subjected to needle-punching treatment and then regulated for its thickness by an embossing calender to obtain a three-layered fabric material having a weight of 210 g/m$^2$ and a thickness of 2.5 mm. The heat retentivity of this three-layered fabric material was evaluated: The heat retentivity in dry heat conditions was 0.64 CLO, the time required for reaching the comfortable temperature within clothing was 16 minutes, the time maintained at this temperature was more than 44 minutes, and the residual moisture was 65 mg/70 cm$^2$. Therefore, this three-layered fabric material was rated excellent in heat retentivity.

What is claimed is:

1. A three-layered fabric material composed of a non-woven fabric of hydrophobic fibers not more than 1 denier in single-filament denier as the inner layer, a fabric of hydrophilic fibers as the intermediate layer and a fabric of hydrophobic fibers larger in denier than the fibers of the intermediate layer as the outer layer.

2. The three-layered fabric material as claimed in claim 1 wherein the fabric forming the intermediate layer is a non-woven fabric.

3. The three-layered fabric material as claimed in claim 1 wherein the fabric forming the outerlayer is a non-woven fabric.

4. The three-layered fabric material as claimed in claim 1, wherein the single-filament denier of the hydrophobic fibers composing the intermediate layer is from 0.01 to 1.0 denier.

5. The three-layered fabric material as claimed in claim 1, wherein the single-filament denier of the hydrophobic fibers composing the outer layer is from 3 to 30 deniers.

6. The three-layered fabric material as claimed in claim 2, wherein the single-filament denier of the hydrophilic fibers composing the intermediate layer is from 0.01 to 1.0 denier.

7. The three-layered fabric material as claimed in claim 3, wherein the single-filament denier of the hydrophilic fibers composing the intermediate layer is from 0.01 to 1.0 denier.

8. The three-layered fabric material as claimed in claim 2, wherein the single-filament denier of the hydrophobic fibers composing the outer layer is from 3 to 30 deniers.

9. The three-layered fabric material as claimed in claim 3, wherein the single filament denier of the hydrophobic fibers composing the outer layer is from 3 to 30 deniers.

10. The three-layered fabric material as claimed in claim 4, wherein the single-filament denier of the hydrophobic fibers composing the outer layer is from 3 to 30 deniers.

* * * * *